United States Patent [19]

Tresser

[11] Patent Number: 4,560,563

[45] Date of Patent: * Dec. 24, 1985

[54] COMPOSITE ICE CONFECTIONS AND PROCESSES FOR PREPARING THEM

[75] Inventor: David Tresser, Bedford, England

[73] Assignee: Thomas J. Lipton, Inc., Engelwood Cliffs, N.J.

[*] Notice: The portion of the term of this patent subsequent to Aug. 2, 2000 has been disclaimed.

[21] Appl. No.: 481,270

[22] Filed: Apr. 5, 1983

Related U.S. Application Data

[63] Continuation of Ser. No. 319,623, Nov. 9, 1981, abandoned, which is a continuation of Ser. No. 225,365, Jan. 15, 1981, abandoned, which is a continuation of Ser. No. 197,993, Nov. 20, 1980, abandoned, which is a continuation of Ser. No. 127,154, Mar. 4, 1980, abandoned.

[30] Foreign Application Priority Data

Mar. 2, 1979 [GB] United Kingdom ............... 7907523
Jul. 20, 1979 [GB] United Kingdom ............... 7925448

[51] Int. Cl.$^4$ .......................... A23G 9/04; A23G 9/24
[52] U.S. Cl. .................................. 426/101; 426/103; 426/606; 426/607; 426/613; 426/304; 426/307; 426/306
[58] Field of Search ............... 426/101, 572, 606, 607, 426/613, 302, 306, 307, 139

[56] References Cited

U.S. PATENT DOCUMENTS

| | | | |
|---|---|---|---|
| 1,638,548 | 8/1927 | Nelson | 426/613 |
| 2,928,745 | 3/1960 | Roylance et al. | 426/607 |
| 3,085,882 | 4/1963 | Gooding et al. | 426/607 |
| 3,099,564 | 7/1963 | Gooding et al. | 426/607 |
| 3,171,748 | 3/1965 | Galenkamp | 426/607 |
| 3,298,837 | 1/1967 | Seiden et al. | 426/607 |
| 3,307,953 | 3/1967 | Siebers | 426/613 |
| 3,333,968 | 8/1967 | Bell et al. | 426/100 |
| 3,361,568 | 1/1968 | Kidger et al. | 426/607 |
| 3,396,037 | 8/1968 | Bell et al. | 426/613 |
| 3,634,100 | 1/1967 | Merksem et al. | 426/607 |
| 3,790,608 | 2/1974 | Caverly | 260/409 |
| 4,086,370 | 4/1978 | Olds et al. | 426/613 |
| 4,234,618 | 11/1980 | Jasko et al. | 426/607 |

FOREIGN PATENT DOCUMENTS

| | | | |
|---|---|---|---|
| 623770 | 2/1963 | Belgium . | |
| 1374072 | 8/1964 | France | 426/607 |
| 1414086 | 9/1965 | France | 426/613 |
| 1459649 | 11/1966 | France | 426/607 |
| 7200253 | 1/1972 | France | 426/613 |
| 7338653 | 10/1973 | France | 426/607 |
| 947672 | 10/1963 | United Kingdom | 426/607 |
| 1017480 | 1/1966 | United Kingdom | 426/613 |
| 1316079 | 5/1973 | United Kingdom . | |
| 2045050 | 10/1980 | United Kingdom | 426/101 |

*Primary Examiner*—Jeanette M. Hunter
*Attorney, Agent, or Firm*—Brumbaugh, Graves, Donohue & Raymond

[57] ABSTRACT

In a composite frozen confection product having ice confection material in contact with a layer of fat-based coating confection comprising a suspension of flavoring and sweetening solids in a fat component, the improvement wherein the fat component of the coating confection has:

(a) a solias content index in each of the following ranges:
70–93% at $-20°$ C.;
65–93% at $-10°$ C.;
55–90% at $0°$ C.;
15–40% at $20°$ C.;
0–12% at $30°$ C.; and
0% at $40°$ C.;

(b) a slip molting point in the range $23°$ C. to $32°$ C.;

(c) a viscosity at $40°$ C. $\eta_{100}$ of at least 35 centipoise, and a viscosity at $40°$ C. $\eta_{CA}$ of at least 30 centipoise; and wherein the coating confection contains 30–70% by weight of the fat component and has a viscosity at $40°$ C. of $\eta_3$ at least 25 poise; $\eta_{100}$ at least 2.0 poise and $\eta_{CA}$ at least 2.2 poise.

18 Claims, No Drawings

COMPOSITE ICE CONFECTIONS AND PROCESSES FOR PREPARING THEM

This is a continuation of application Ser. No. 319,623, filed on Nov. 9, 1981, which in turn is a continuation of Ser. No. 225,365 filed Jan. 15, 1981, which is a continuation of Ser. No. 197,993 filed 11/20/80, which is a continuation of Ser. No. 127,154 filed 3/4/80, all now abandoned.

The invention relates to composite ice confection products having layers or coatings (often called couvertures) of fatty material, and to processes for preparing them.

Ice confections with fat-based coatings are well-established products. One known coating is chocolate, based on cocoa-butter. Other fats for use in chocolate-like coatings, and some used. One fat that has been widely used is coconut oil.

Fat-based coatings can display properties that are unsatisfactory to the consumer, the producer or both. Such properties include the tendency to break, flake, or rub off during production or consumption and to soften too much in the hands.

Another important way in which fat-based coatings can be unsatisfactory is that they may give an unsuitable mouthfeel in the context of the product in which they are used. On the one hand, such coatings may yield a lingering, cloying mouthfeel, seeming to clog the teeth and oral surfaces, often also imparting bitterness to chocolate flavourings. On the other hand, coatings may fail to appear to contain appreciable chocolate flavouring or texture.

There are two main categories of chocolate coated products relevant to this invention: enrobed products and dipped products. Enrobed products are represented, for example, by choc ice bars (enrobed ice cream bars). Ice cream bars enrobed by passage through a curtain of molten coating material to cover the top and sides, and rollers are used to coat the undersides during passage through the enrober. An airblower generally removes surplus coating material. Enrobing has been conventionally practised with cocoa butter based coatings, sometimes including vegetable fat blends.

Cocoa butter, a natural material which is expensive and subject to unstable supply and market conditions, is also not ideal because it gives a coating which melts slowly on consumption, and leaves a waxy impression when eaten as part of a composite ice confection. The vegetable fat blends have also suffered from comparable defects.

Dipped products are represented for example by many chocolate coated confections on sticks, produced by dipping a core of material to be coated into a bath of molten coating material. Chocolate flavoured coatings for dipped products have been based on cocoa butter and on coconut oil. Cocoa butter does not lend itself to satisfactory processing in this way: it is hard to obtain a thin uniform coated product. Coconut oil is in many ways a desirable material but, like cocoa butter, it produces an undesirably brittle coating, and again is subject to market and supply difficulties.

Another use of coatings based on fat compositions is in the coating of baked confectionery containers or wafers for ice confections. Fat coating of such baked articles is disclosed for example in GB 947,672 (Big Drum, Inc.). It has been found, however, that with the fat coatings in use there is a problem of loss of crispness in the baked product during storage for a reasonable time, due to water transfer from the adjacent ice confection.

According to the invention there are provided composite frozen confection products having ice confection material in contact with a layer of fat-based coating confection comprising a suspension of flavouring and sweetening solids in a fat component, where the fat component of the coating confection has:

(a) solids content index (SCI) values (%) (as defined below) in each of the following ranges:
70–93 at −20° C.;
65–93 at −10° C.;
55–90 at 0° C.;
15–40 at 20° C.;
0–12 at 30° C.;
0 at 40° C.;

(b) slip melting point in the range 23°–32° C.; and (c) a viscosity at 40° C. corresponding to measured values (as defined below) as follows:
$\eta_{100} \geq 35$ centipoise;
$\eta_{CA} \geq 30$ centipoise;

and wherein the coating confection contains for example 30–70% by weight of the fat component and has a viscosity at 40° C. of $\eta_3$ at least 25 poise; $\eta_{100}$ at least 2.0 poise and $\eta_{Ca}$ at least 2.2 poise. (In the foregoing and succeeding description reference is made to a number of parameters defined more closely by reference to test methods described hereinbelow.)

Preferably these fat compositions can also have SCI values (%) as follows,
at least 75%, e.g. 75–90 at −20° C.;
at least 75%, e.g. 75–85 at −10° C.;
at least 65%, e.g. 65–75 at 0° C.

They can also have an SCI of at least 57.5 at 10° C., e.g. 57.5–90%. Their preferred slip melting points are in the range 26° to 31° C.

We find that such fats give particularly good results in terms of manufacturing convenience and consumer acceptability owing to their lack of excessive brittleness. We find that they can be formulated into confectionery coating compositions of distinctly good flavour and mouthfeel on their consumption as part of a composite frozen confection. It can also be of advantage if the fat is one that gives a confectionery composition which in the test given below performs with a brittleness time of >45 seconds.

Normally such fats show a change in solids content over the last 5° C. of their melting profile of at least 20% of their solids content at −20° C. Their SCI values at 10° C. and 20° C. can differ by, for example, at least about 25%, e.g. at least about 30%, and sometimes at least 35%. Their maximum rate of solids formation upon cooling is normally above 13–16% per minute, with the time taken to reach 50% solids normally less than 5–6 minutes. The maximum solids content achieved in ≦20 minutes is normally in the range 70–90%.

Normally we prefer for ice confection use those fats which yield confectionery coatings of the following viscosities at 40° C. when such coatings are formulated using 45% fat content by weight:
$\eta_3 \geq 25$ poise, preferably 30–50 poise;
$\eta_{100} \geq 2.0$ poise, preferably 2.5–8.0 poise;
$\eta_{CA} \geq 2.2$ poise, preferably 2.5–6.0 poise.

All these parameters are as defined by the test methods noted below or their equivalents.

Preferably these fats according to the invention are made up by using interesterified mixtures of fats containing acyl groups derived from edible naturally-obtained oils or their equivalent. For example, we prefer to use interesterified blends of (a) lauric fats or oils and (b) non-lauric fats or oils in the weight proportions (a) up to 85%, e.g. 50%–75%; to (b) down to 15%, e.g. 45%–25% for preference: lower amounts of (a) of 15–50%, e.g. 25–40%, can also be used.

"Lauric fat or oil" means an edible oil or fat having lauric and/or myristic acids as substantial fatty acyl constituents, (e.g. constituting 40–50% or more of the acyl groups) with the remaining fatty acid content containing very little unsaturation: examples are palm kernel oil (preferred), babassu oil, coquito oil, coconut oil (also preferred).

The term "non-lauric fat or oil" means an edible oil in which the principal fatty acyl content is not lauric acid, and for example in which there is a substantial amount of $C_{16}$ and/or $C_{18}$ unsaturated acyl groups, e.g. oleic, linoleic and/or linolenic acyl groups: the remaining bulk of the acyl groups is largely saturated, (e.g. $C_{16}$ and/or $C_{18}$ acids). Examples of such non-lauric oils are cottonseed oil, peanut oil, and particularly rapeseed oil (e.g. low-erucic rapeseed oil) and soybean oil, and also palm oil.

When palm oil is used as the non-lauric oil its preferred proportions before interesterification are in the range 45%–25% by weight, especially 40%–35% by weight.

A particularly desirable fat in this category comprises a randomly interesterified blend of palm kernel oil (50%–65%) with palm oil (50%–35%), especially in the proportions 60:40.

Of course it is understood that in such interesterified blends other sources of acyl groups can be substituted for those quoted and for one another if their proportions and types of acyl groups are sufficiently similar, without regard to their identical triglyceride combination or isomeric analysis. As an example, palm oil can in such compositions be substituted often by lard.

Another particularly preferred method of making up the fat according to the invention is to use an interesterified blend of palm kernel oil with rapeseed oil, in the proportions 15–60% to 85–40% respectively.

When randomly interesterified blends of a lauric fat or oil and a non-lauric oil other than palm oil, e.g. in proportions of 10–70% and 90–30% respectively, are used, the non-lauric oil or blend may be hardened (preferably selectively) to achieve the desired slip melting point. (Mixtures containing palm oil are preferably not hardened because palm oil is already hard enough for most purposes.)

By selective hardening we mean exposure of the fat material to be treated to a catalyst which brings about isomerisation of the ethylenic bonds without substantial hydrogenation: considerable geometrical isomerisation (cis←→trans) occurs. A suitable known catalyst for the purpose is a poisoned nickel catalyst (a fresh nickel catalyst gives much hydrogenation (unselective hardening) but little of the isomerisation required in selective hardening).

Preferably, because a desired slip melting-point in the product can be achieved more accurately, the interesterifed fat is selectively hardened rather than the liquid oil or the blend. When a non-lauric oil other than palm oil is used, it can be one which is liquid or semi-liquid (e.g. of mushy consistency) at 20° C.

The fat-based coating confectionery compositions for use with ice confections comprise edible fat with a suspension therein of sweetening and (e.g. chocolate) flavouring agents in solid form, e.g. sugar and cocoa powder or substitutes therefor, and optionally also containing suspended milk solids.

It may be stated as a guide and without limitation that we prefer to use confectionery compositions containing from 30–70%, preferably 30–55% by weight fat, suitably at least 40%, e.g. about 45%. Emulsifiers, e.g. lecithin may be present as desired, e.g. in minor proportions about 0.2–1%, e.g. 0.5% up to 1%.

The coating confectionery can preferably have viscosities (at 40° C.) as follows:

$\eta_3$ at least 25 poise, e.g. 30–45 poise;
$\eta_{100}$ at least 2.0 poise, e.g. 2.5–6.5 poise;
$\eta_{CA}$ at least 2.2 poise, e.g. 2.5–6.0 poise;

especially where they include milk solids. Especially where the coating confectionery comprises no milk solids, they can preferably have viscosities: (at 40° C.) as follows:

$\eta_3 \geq 30$, e.g. 35–50 poise;
$\eta_{100} \geq 2.5$, e.g. 3.0–8.0 poise;
$\eta_{CA} \geq 2.5$, e.g. 3.0–6.0 poise.

One preferred example of a dark chocolate composition for use in composite frozen confections according to the invention, comprises 31% by weight of interesterified palm kernel oil and palm oil mixture (60:40 w/w), 24% cocoa mass, 39% sugar, with emulsifier and flavourant. A corresponding milk chocolate formulation can contain 33% by weight of a similar fat, and dried milk product in place of some of the sugar, to taste.

Such compositions among others can be used in accordance with the invention in processes for enrobing ice confections, or otherwise in any suitable way. It is certainly not excluded to use these compositions for dipping ice confections and so forming coatings otherwise than in an enrober, but it may then be necessary to apply blower air currents to thin the resulting coatings to a desired level. The compositions can also be used to coat wafer containers for subsequent filling with ice confections, e.g. cones.

Although the invention has been particularly illustrated so far by fats made up of edible oil blends as described above, it is noted that very satisfactory fats and compositions can be made up by using blends or interesterified mixtures with other glyceride materials. For example, certain fats suitable for use according to the invention are triglyceride mixtures comprising a major proportion of acyl groups derived from lauric fats or oils, or non-lauric fats or oils (optionally hydrogenated unselectively or else selectively hardened), and a minor proportion by number of acyl groups with substantially short-chain lengths, e.g. up to $C_6$. Preferably all or nearly all the short chain acyl groups are present in mixed triclycerides containing both short and long chains, e.g. $C_{\geq 16}$ or $C_{\geq 18}$. So, for example, when palm kernel oil is used as a component of the fat, either alone, or in blend with, or in interesterified mixture with another lauric fat or oil or a non-lauric fat or oil, the short chain acyl groups can be introduced by interesterification with for example glyceryl triacetate or glyceryl tributyrate or glyceryl trihexanoate, or they can be introduced by blending (and optional interesterification) with an acetylated long chain monoglyceride or diglyceride, or a long chain mono- or di-glyceride acylated with short chain acyl groups.

Preferably the short chain acyl groups form up to about 20% by number of the total acyl groups of the triglyceride mixture.

Where the short chain acyl groups are acetyl groups, they are preferably present at up to the equivalent of the number of acyl groups that would be provided by 5% by weight triacetin in tripalmitin or a mainly palmitic fat or oil, suitably up to 3% by weight, e.g. 2% by weight. Where the short chain acyl groups are butyryl or hexanoyl groups they are preferably present at up to the equivalent of the number of acyl groups that would be provided by the 10% by weight glyceryl trihexanoate in tripalmitin or a mainly palmitic fat or oil, suitably up to 5% by weight.

The use of hardened lauric oils gives fats with higher slip melting point than when untreated lauric oils are used. When hardened lauric oils are used, somewhat more short chains can be present than otherwise, since one effect of these is to lower the slip melting point.

The solids content index, brittleness time and viscosity referred to herein are measurements obtained as described below. The slip melting point is measured by standard procedures well known to those skilled in the filed to which this invention relates.

In this specification the solids content index (SCI) refers to a measurement obtained by the following or an equivalent test method: a sample of fat is placed in a low-temperature measurement cell of a wide-line nmr spectrometer calibrated for measurements of sample quantity, such as the "Quantity Analyser" commercially available from Newport Instruments, Newport Pagnell, Buckinghamshire, England. The sample is held at a required temperature for 10 minutes and then the percent solid fat is obtained from the instrument indication. This result is an SCI (%) referred to the test temperature.

The rate of crystallisation of a fat composition sample can conveniently be measured under conditions when the sample (at 32° C.) is placed in an nmr cell of the same wide-line nmr spectrometer at −20° C., and monitoring the signal level from the spectrometer at frequent intervals over about 20 minutes, intercalated with frequent temperature measurements using a temperature probe inserted whenever required into the sample cell, and removed to allow nmr measurement. The maximum rate of solids formation achieved is the steepest tangent to the curve of solids content versus time obtained from these measurements, and is expressed in % solids per minute.

In this specification "the brittleness time" refers to a measurement obtained by the following or an equivalent test method in which what is estimated is the speed at which a confectionery coating composition (containing the fat to be tested) becomes brittle on being used to coat a frozen confectionery article. The fat composition to be tested is incorporated at 59.2% of a confectionery composition cont containing 25.7% icing sugar, 12.9% cocoa powder (of 10–12% fat content), 1.7% skim milk powder and 0.5% lecithin. The total fat content of the composition should be 60.6%. Any conventional formulation process can be used: desirably the composition is rendered to a final particle size of 17–19 μm by micrometer screw gauge, with most particles of 14–16 μm as measured by a Sheen gauge: by Coulter Counter (Trade Mark) measurement 75% of particles are desirably <22 μm. The confectionery composition prepared this way is melted at 36° C. for 20 minutes in a gently stirred jacketed vessel, and used to coat frozen ice confection (ice cream) blocks on sticks in the following way. The blocks are desirably of 30 g weight and 100% overrun, stored at −26° C., taken from the store and immersed 9 seconds in moulds surrounded by water at 30° C., so that their surface temperature rises to −5° C. and their interior temperature to −15° C.: the blocks are then immediately dipped into the molten coating composition (immersion for about ½ second), withdrawn, and small sections of the coated block repeatedly cut off with a relatively blunt implement at closely-spaced time intervals by any suitable method until the coating can be heard to give an audible crack on cutting. The purpose is to simulate the conditions under which such compositions and coatings are bitten during consumption, and a test consumer can be used if desired. The time elapsed between the coating immersion and the propensity of the coatings to give an audible crack on cutting is taken as the "brittleness time" as referred to in this specification.

In this specification the viscosity measurements $\eta_3$, $\eta_{100}$ and $\eta_{CA}$ are measurements obtained by the following or equivalent test methods. Viscosity measurements can be made on fat compositions or on coating compositions made therefrom. Where a coating composition is characterized, the viscosity measurement is made on the composition itself. Where a fat composition is in question, the viscosity measurements are either made on and referred to the fat composition itself or made on and referred to a coating composition comprising 45% or 59.2% by weight of the fat. Normally, coating compositions of 45% fat are used as standard where the coating compositions are intended for use in enrobing ice confections, and compositions of 59.2% fat where they are intended for use by dipping processes.

The parameters $\eta_3$ and $\eta_{100}$ represent the apparent viscosity at the quoted temperature (e.g. 40° C.) at shear rate of respectively 3 sec$^{-1}$ and 100 sec$^{-1}$. The parameter $\eta_{CA}$ represents the Casson plastic viscosity. $\eta_{100}$ and $\eta_{CA}$ are measured, for example, using a Haake Rotovisko MVI (Trade Mark) viscometer with a rotating inner cylinder. The fat or coating compositions to be measured are desirably melted to a temperature 15° C. above the slip melting point and then equilibrated 15 minutes at the temperature of measurement. When measurements are performed on couverture compositions these are pre-sheared 15 minutes at the measuring temperature at about 40 sec$^{-1}$. For good order, apparent viscosity readings are taken through a range of machine shear rate settings in both ascending and descending senses, to determine the apparent viscosity at the specified shear rate via determination of the shear stress for a given machine setting.

The parameter $\eta_{CA}$ (Casson plastic viscosity) is determined (e.g. using a similar viscometer to that mentioned above), but according to the method of N. Casson (Rheology of Disperse Systems, Pergamon Press, London 1959).

The parameter $\eta_3$ is measured for example using a Deer Rheometer PDR81 (Trade Mark) having an inner rotating cylinder or bob lowered onto a temperature-jacketed outer stationary cylinder containing the sample composition. The inner cylinder or bob is driven at a controlled shear stress and the shear rate induced is measured: the apparent viscosity at a 3 sec$^{-1}$ shear rate is determined from the results obtained at a succession of shear stresses.

The coating compositions described above have particularly desirable properties for use as enrobing couvertures. That is, in coating compositions containing fat, cocoa powder or a substitute therefor, and sugar, optionally with a milk product and optionally with additives such as emulsifiers, these fats make compositions having desirable properties for use in the enrobing processes of ice confection coating, together with satisfactory organoleptic qualities. They are suitably formulated for example with viscosity parameter $\eta_{100} \geq 35$, preferably $\geq 50$, and parameter $\eta_{CA} \geq 30$, preferably $\geq 35$.

We find that certain of the preferred fats in this category (e.g. 60:40 interesterified palm kernel oil:palm oil) not only give superior processing characteristics in enrobing processes, with reduced brittleness, but the resulting coatings have even better mouthfeel than that of coatings based on cocoa butter (which leads to a very brittle result).

The invention is now described for illustration but without limitative effect by means of the following Examples in conjunction with the foregoing description.

EXAMPLE 1

Blends of 60% PKO with 40% palm oil were made from neutralised, fully refined dried oils. 2–2.5 kg batches of the blends were interesterified in a batch process, in a flask fitted with a vigorous stirrer, nitrogen inlet, and temperature control probe. The blends were heated to 110° C. under $N_2$, stirred vigorously and sodium methoxide catalyst (0.2% on the oil) added into the vortex. Stirring was maintained for 30 minutes.

The product was washed with 1% acetic acid solution, followed by water, to remove catalyst and soap, and thoroughly dried. Completion of interestification was checked by triglyceride GLC analysis.

The dried, interesterified oils were bleached with 2% bleaching earth at 110° C. under nitrogen for 30 minutes. 1% kieselguhr was added to the cooled blends, which were filtered.

650 g batches of the interesterified blends were deodorised for 4 hours at 180° C. under vacuum, and 0.1% of lecithin was added to each deodorised batch, as antioxidant.

Batches of this interesterified blend had slip melting points of 29.5°–31° C. and had solids content melting profiles and crystallization curves as shown in FIGS. 1 and 2, when analysed under the standard test conditions described above.

The maximum rate (% minute) of solids formation under the standard test conditions in the batches was 16–23%/minute, with 4–5 minutes required on cooling to reach 50% solid. They had periodate values less than 4, usually 0.5 or less, iodine values of about 31–32, and hydroxyl values about 8–10. The refined oils used in their preparation had FFA contents less than about 0.5 and soap values less than about 0.01.

The percentages solids present at various temperatures were as follows:

| | |
|---|---|
| −20° C. | 79–85%; |
| −10° C. | 77–82%; |
| 0° C. | 67–72%; |
| 10° C. | 48–58%; |
| 20° C. | 16–36%; |
| 25° C. | 5–20%; |
| 30° C. | 0–5%; |
| 35° C. | 0%. |

Excellent enrobed ice cream bars are prepared by per se conventional handling techniques using these products. Processing was easier (shorter setting-up time and less brittle) than with a conventional couverture based on cocoa butter.

EXAMPLES 2 AND 3

(A) Preparation of fat compositions

Crude low-erucic rapeseed oil was neutralised with 0.8N NaOH. After a water wash, the oil was boiled with 1.5% its weight or 6N soda ash and 1% by weight of a sodium silicate solution for 30 minutes at 105° C., then washed free of soap and dried. Bleaching was carried out with 1% Tonsil Standard FF (Trade Mark) bleaching compound 20 minutes at 105° C. under vacuum. The neutralised bleached oil was deodorised 30 minutes at 180° C.

The rapeseed oil so treated was blended with fully-refined palm kernel oil in the weight ratio 40 rapeseed oil to 60 palm kernel oil in a first case (Example 2) and 50 to 50 in a second case (Example 3). Batches of the blends were interesterified continuously with 0.05% by weight sodium catalyst at 125° C. for 4 minutes. The product oil was then added to a vessel partly filled with diluted phosphoric acid (to neutralise excess sodium). The treated product oil (interesterified blends) were washed with 0.2N NaOH and water; when free of soap the blends were dried and filtered over 0.2% Hyflow (Trade Mark) filter aid.

Batches of the blends were selectively hardened under agitation in an autoclave fitted with six-blade turbine stirrer and four baffles. Hydrogen was blown into the headspace of the autoclave. Hardening was carried out at 180° C. with 0.5% by weight of sulphur-poisoned nickel catalyst at 3–5 kg/cm² $H_2$ pressure. The blends were hardened to slip melting-points of 26.8° C. (Example 2) and 26.7° C. (Example 3). The selectively hardened interesterified blends were neutralised, freed of soap, dried, bleached and deodorised in similar manner as before. At 60° C., 0.1% fresh lecithin was added to each as antioxidant.

The properties of the fats prepared as described above were found to conform desirably with those described above.

(B) Preparation of confectionery coating compositions and the confections

Using normal refining and conching procedures, the fat compositions prepared according to the invention in Examples 2(A) and 3(A) were made up into confectionery coating compositions containing 43.6% of the respective fat, 39.9% sugar, 16% cocoa powder (10/12 fat), and 0.5% lecithin, with optional flavourant to taste. These compositions were found to have highly desirable physical properties when used to coat ice confections (e.g. using an ice-briquette enrober and 40° C. coating temperature) and the flavour and mouthfeel characteristics of the products were found to compare satisfactorily with those of products based on 20% cocoa-butter fat.

EXAMPLE 4

(i) Further interesterified blends of palm kernel oil (PKO) and palm oil (PO) according to the invention were prepared as follows.

A crude blend (60 PKO:40 PO) was made up in a vacuum bleacher, vacuum dried, neutralised with 6N soda ash, washed and dried. The dried product was bleached at 95°–100° C. for 30 minutes with 1% C300 bleaching earth, filtered and transferred to a clean vessel. There followed interesterification with 0.3–0.4% sodium methoxide catalyst, and the treated blend was washed, vacuum dried, and post-refined with 1% AA bleaching earth at 95°–100° C. for 30 minutes. After filtration and deodorisation 0.1% lecithin was added.

(ii) The interesterified blends produced in Example 4(i) were used to make up confectionery coating compositions according to the invention, which were used to enrobe ice confection briquettes as described in Examples 2 and 3.

The compositions (Examples 4(A), 4(B), 4(C), and 4(D)) were of the following constituents:

|  | 4A | 4B | 4C | 4D |
|---|---|---|---|---|
| Cocoa solids (non-fat) | 14.2% | 16.3% | 5.1% | 5.1% |
| Milk solids (non-fat) | — | — | 18.8% | 18.8% |
| Sugar | 39.9% | 39.0% | 30.6% | 30.6% |
| Lecithin | 0.5% | 0.5% | 0.5% | 0.5% |
| Cocoa butter | 1.8% | 13.2% | 0.7% | 6.5% |
| Butterfat | — | — | 3.5% | 3.9% |
| Interesterified fat blend of Example 4(i) | 43.6% | 31.0% | 40.8% | 34.6% |
| (Total fat content) | (45.4%) | (44.2%) | (45.0%) | (45.0%) |

All showed excellent processing and consumer-appreciable properties. In comparative evaluations, the interesterified blends according to embodiments of this invention were shown to give superior results to otherwise equivalent blends of PKO and PO without interesterification, (such comparative blends lack the physical properties of the fats of this invention specified above). Compositions 4B and 4D had particularly desirable processing and consumer-appreciable characteristics.

The invention is not limited to the use of the materials particularly mentioned above. Further particular examples of fat compositions falling within the general classes mentioned above, which are useful, are interesterified blends of palm kernel oil and cottonseed oil (15%:85%), selectively hardened to slip melting point 25°–29° C.; of palm kernel oil and low-erucic rapeseed oil (15%:85%), selectively hardened to slip melting point 26° C; and of palm kernel oil and soyabean oil (15%:85%), selectively hardened to slip melting point 25°–29° C. In each case as in the other cases described above the non-lauric oil can in part or even wholly be substituted by alternative materials, e.g. other non-lauric oils, or tallow olein, or palm olein.

I claim:

1. A frozen ice confection product which comprises an ice confection in contact with a layer of fat-based confectionery coating said coating having at 40° C. a viscosity $\eta_3$ of at least 25 poise; $\eta_{100}$ of at least 2.0 poise and $\eta_{CA}$ at least 2.2 poise and comprising flavoring and sweetening solids suspended in 30–70% by weight of a fat component, which fat component has a solid content index in the following ranges:
   70–93% at −20° C;
   65–93% at −10° C.;
   55–90% at 0° C.;
   15–40% at 20° C.;
   0–12% at 30° C.;
   0% at 40° C.;
a slip melting point in the range of 23° C. to 32° C.; and at 40° C. a viscosity $\eta_{100}$ of at least 35 centipoise, and a $\eta_{CA}$ of at least 30 centipoise.

2. A frozen ice confection product according to claim 1, wherein the fat component has a solids content index of
   at least 75% at −20° C.;
   at least 75% at −10° C.;
   and at least 65% at 0° C.

3. A frozen ice confection product according to claim 1 wherein the fat component has a solids content index in the range 57.5–90% at 10° C.

4. A frozen ice confection product according to claim 1 wherein the solids content indices of the fat component at 10° C. and at 20°C. differ by at least about 25%.

5. A frozen ice confection product according to claim 1 wherein the solids content indices of the fat component at 10° C. and at 20° C. differ by at least about 30%.

6. A frozen ice confection product according to claim 1 wherein the fat component has solids content index in each of the following ranges:
   at −20° C., about 79–85%,
   at −10° C., about 77–82%,
   at 0° C., about 67–72%,
   at 10° C., about 48–58%,
   at 20° C., about 16–36%,
   at 25° C., about 5–20%,
   at 30° C., about 0–5%,
   at 35° C., 0%.

7. A frozen ice confection product according to claim 1 wherein the confectionery coating has viscosities at 40° C., in the ranges $\eta_3$ 30 to 50 poise; $\eta_{100}$ 2.5 to 8.0 poise; $\eta_{CA}$ 2.5 to 60 poise.

8. A frozen ice confection product according to claim 1 wherein the confectionery coating contains at least 40% w/w of the fat component.

9. A frozen ice confection product according to claim 1 wherein the fat mixture comprises 25–85% lauric fat or oil.

10. A frozen ice confection product according to claim 1, wherein the fat component comprises an interesterification product of 50–65% palm kernel oil and an oil selected from the group consisting of 35–50% palm oil and 35–50% low erucic rapeseed oil.

11. A frozen ice confection product having ice confection material in contact with a layer of fat-based confectionery coating according to claim 1 wherein the fat component of the confectionery coating comprises an interesterification product of 60–65% palm kernel oil and 35–40% palm oil.

12. A frozen ice confection product having ice confection material in contact with a layer of fat-based confectionery coating according to claim 1 wherein the fat component of the confectionery coating comprises an interesterification product of 15–85% of an oil selected from the group consisting of coconut oil and palm kernel oil with 15–85% of an oil selected from the group consisting of low-erucic rapeseed oil, cottonseed oil, soyabean oil and groundnut oil.

13. A frozen ice confection product according to claim 1 wherein the fat component of the confectionery coating comprises an interesterification product of a fat mixture containing materials selected from the group consisting of lauric fats and lauric oils.

14. A frozen ice confection product according to claim 13 wherein the interesterification product also contains a non-lauric oil.

15. A frozen ice confection product according to claim 1 wherein the fat component of the confectionery coating comprises an interesterification product of a fat mixture containing materials selected from lauric fat, lauric oil and a glyceride containing short-chain (C≦6) acyl groups.

16. A frozen ice confection product according to claim 1 wherein the fat component of the confectionery coating comprises an interesterification product of a fat mixture containing materials selected from lauric fat, lauric oil and a glyceride containing short-chain (C≦6) acyl groups and a glyceride containing long-chain (C≦16) acyl groups.

17. A process for producing a frozen ice confection product which comprises bringing into contact an ice confection and a fat-based confectionery coating, said coating having at 40° C. a viscosity $\eta_3$ of least 25 poise; $\eta_{100}$ of at least 2.0 poise and $\eta_{CA}$ of at least 2.2 poise and comprising flavoring and sweetening solids suspended in 30–70% by weight of a fat component, which fat component has a solid content index in the following ranges:

70–93% at −20° C.;
65–93% at −10° C.;
55–90% at 0° C.;
15–40% at 20° C.;
0–12% at 30° C.;
0% at 40° C.;

a slip melting point in the range of 23° C. to 32° C.; and at 40° C. a viscosity $\eta_{100}$ of at least 35 centipoise; and $\eta_{CA}$ of at least 30 centipoise.

18. A process according to claim 17, wherein the ice confection is coated with the fat-based confectionery coating at a temperature of about 40° C.

* * * * *

UNITED STATES PATENT AND TRADEMARK OFFICE
CERTIFICATE OF CORRECTION

PATENT NO. : 4,560,563

DATED : December 24, 1985

INVENTOR(S) : David Tresser

It is certified that error appears in the above-identified patent and that said Letters Patent is hereby corrected as shown below:

First Page, line 4 of Item 63, "Nov. 20, 1980" should read --Oct. 8, 1980--;

Col. 1, line 8, "Nov. 20, 1980" should read --Oct. 8, 1980--;

First Page, 7th line of ABSTRACT, "solias" should read --solids--;

First Page, 15th line of ABSTRACT, "molting" should read --melting--;

First Page, 17th line of ABSTRACT, "anda" should read --and a--;

Col. 1, line 17, after "fats" insert --have been proposed--;

Col. 2, line 27, "$\eta_{Ca}$" should read --$\eta_{CA}$--;

Col. 3, line 13, "acid" should read --acyl--;

Col. 5, line 24, "filed" should read --field--;

Col. 5, line 57, delete "cont";

UNITED STATES PATENT AND TRADEMARK OFFICE
CERTIFICATE OF CORRECTION

PATENT NO. : 4,560,563                                Page 2 of 2

DATED     : December 24, 1985

INVENTOR(S) : David Tresser

It is certified that error appears in the above-identified patent and that said Letters Patent is hereby corrected as shown below:

Col. 8, line 47, "the" should read --ice--;

Col. 8, line 53, "(10/12" should read --(10/12%--;

Col. 11, line 13, before "least" insert --at--.

Signed and Sealed this

Third Day of June 1986

[SEAL]

Attest:

DONALD J. QUIGG

Attesting Officer          Commissioner of Patents and Trademarks